(12) United States Patent
Sahin et al.

(10) Patent No.: US 10,802,731 B1
(45) Date of Patent: *Oct. 13, 2020

(54) POWER SAVING MECHANISMS FOR A DYNAMIC MIRROR SERVICE POLICY

(71) Applicant: EMC IP HOLDING COMPANY LLC, Hopkinton, MA (US)

(72) Inventors: Adnan Sahin, Needham, MA (US); Sachin More, Northborough, MA (US); Preston Crow, Ashland, MA (US); Ron Arnan, Brookline, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,036

(22) Filed: Jan. 28, 2019

Related U.S. Application Data

(60) Division of application No. 15/233,461, filed on Aug. 10, 2016, now Pat. No. 10,235,072, which is a
(Continued)

(51) Int. Cl.
*G06F 12/00* (2006.01)
*G06F 3/06* (2006.01)
*G06F 12/0866* (2016.01)

(52) U.S. Cl.
CPC .......... *G06F 3/0625* (2013.01); *G06F 3/0644* (2013.01); *G06F 3/0689* (2013.01);
(Continued)

(58) Field of Classification Search
CPC .... G06F 3/0625; G06F 3/0644; G06F 3/0689; G06F 12/0866; G06F 2212/1028; G06F 2212/21; G06F 2212/70
See application file for complete search history.

(56) References Cited

U.S. PATENT DOCUMENTS 5,493,670 A 2/1996 Douglis et al.
5,829,046 A 10/1998 Tzelnic et al.
(Continued)

FOREIGN PATENT DOCUMENTS

JP 2008102578 A 5/2008

OTHER PUBLICATIONS

Li, et al.; "Exploiting Redundancy to Construct Energy-Efficient, High-Performance RAIDs," Tech. Rep. TR-05-07-04, Computer Science and Engineering Department, University of Nebraska-Lincoln, 2005.
(Continued)

*Primary Examiner* — Kalpit Parikh
(74) *Attorney, Agent, or Firm* — Schmeiser, Olsen & Watts LLP; Timothy P. Collins

(57) ABSTRACT

Described is storage system and method for reducing power consumption. The storage system has first and second physical disks configured to provide mirroring. The first physical disk is placed into a power-saving mode of operation, while the second physical disk is in an active mode of operation responding to read and write requests. The first physical disk transitions from the power-saving mode of operation to an active mode of operation for destaging writes pending from cache to the first physical disk, while the second physical disk responds to read and write requests. The second physical disk transitions from the active mode of operation to the power-saving mode of operation, while the first physical disk responds to read and write requests.

13 Claims, 12 Drawing Sheets

Related U.S. Application Data continuation of application No. 14/843,281, filed on Sep. 2, 2015, now Pat. No. 9,448,732, which is a continuation of application No. 11/770,837, filed on Jun. 29, 2007, now Pat. No. 9,158,466.

(52) U.S. Cl.
CPC .. *G06F 12/0866* (2013.01); *G06F 2212/1028* (2013.01); *G06F 2212/21* (2013.01); *G06F 2212/70* (2013.01)

(56) References Cited

U.S. PATENT DOCUMENTS

| | | | |
|---|---|---|---|
| 5,991,825 | A | 11/1999 | Ng |
| 6,263,411 | B1 | 7/2001 | Kamel et al. |
| 6,611,896 | B1 | 8/2003 | Mason, Jr. et al. |
| 6,671,774 | B1 | 12/2003 | Lam et al. |
| 6,809,896 | B2 * | 10/2004 | Espeseth ............ G11B 5/5534 360/78.07 |
| 6,954,833 | B1 | 10/2005 | Yochai et al. |
| 7,353,406 | B2 | 4/2008 | Yagisawa et al. |
| 7,469,315 | B2 | 12/2008 | Watanabe et al. |
| 2002/0120605 | A1 | 8/2002 | Gagne |
| 2004/0019859 | A1 | 1/2004 | Ravi et al. |
| 2005/0144486 | A1 | 6/2005 | Komarla et al. |
| 2005/0160221 | A1 | 7/2005 | Yamazaki et al. |
| 2006/0190699 | A1 | 8/2006 | Lee |
| 2006/0206662 | A1 | 9/2006 | Ludwig et al. |
| 2006/0209444 | A1 | 9/2006 | Song et al. |
| 2007/0143542 | A1 | 6/2007 | Watanabe et al. |
| 2007/0162692 | A1 | 7/2007 | Nishimoto et al. |
| 2007/0208921 | A1 | 9/2007 | Hosouchi et al. |
| 2008/0126702 | A1 | 5/2008 | Zimoto et al. |
| 2008/0168223 | A1 | 7/2008 | Reeves et al. |
| 2008/0256307 | A1 | 10/2008 | Fujimoto |
| 2010/0280651 | A1 | 11/2010 | Edling et al. |

OTHER PUBLICATIONS

Arnan, et al.; Related U.S. Appl. No. 11/770,824, filed Jun. 29, 2007; 48 pages.
More, et al: Related U.S. Appl. No. 11/771,561, filed Jun. 29, 2007; 52 pages.
Non-Final Office Action in U.S. Appl. No. 11/771,561, dated Mar. 15, 2010; 10 pages.
Notice of Allowance in U.S. Appl. No. 11/771,561, dated Sep. 14, 2010; 11 pages.
Non-Final Office Action in U.S. Appl. No. 11/770,824, dated Jul. 21, 2010; 9 pages.
Non-Final Office Action in U.S. Appl. No. 11/770,824, dated Feb. 4, 2011; 10 pages.
Notice of Allowance in U.S. Appl. No. 11/770,824, dated Jul. 6, 2011; 8 pages.
Non-Final Office Action in U.S. Appl. No. 14/843,281, dated Oct. 5, 2015; 30 pages.
Final Office Action in U.S. Appl. No. 14/843,281, dated Apr. 15, 2016; 18 pages.
Notice of Allowance in U.S. Appl. No. 14/843,281, dated Jun. 21, 2016; 8 pages.
Carrera, Enrique V., et al.; "Conserving Disk Energy in Network Servers", Proceedings of the 2003 International Conference on Supercomputing (ICS-03), pp. 86-97, New York, Jun. 23-26, 2003, ACM Press.
Restriction and/or Election Requirement in U.S. Appl. No. 11/770,837, dated Sep. 4, 2009; 5 pages.
Non-Final Office Action in U.S. Appl. No. 11/770,837, dated Oct. 21, 2009; 14 pages.
Final Office Action in U.S. Appl. No. 11/770,837, dated Jun. 9, 2010; 17 pages.
Non-Final Office Action in U.S. Appl. No. 11/770,837, dated Oct. 4, 2010; 15 pages.
Final Office Action in U.S. Appl. No. 11/770,837, dated Mar. 21, 2011; 18 pages.
Non-Final Office Action in U.S. Appl. No. 11/770,837, dated Sep. 1, 2011; 14 pages.
Non-Final Office Action in U.S. Appl. No. 11/770,837, dated Apr. 8, 2015; 5 pages.
Notice of Allowance in U.S. Appl. No. 11/770,837, dated Jul. 20, 2015; 13 pages.
Non-Final Office Action in U.S. Appl. No. 15/233,461, dated Aug. 10, 2018; 7 pages.
Notice of Allowance in U.S. Appl. No. 115/233,461, dated Jan. 3, 2019; 8 pages.

* cited by examiner

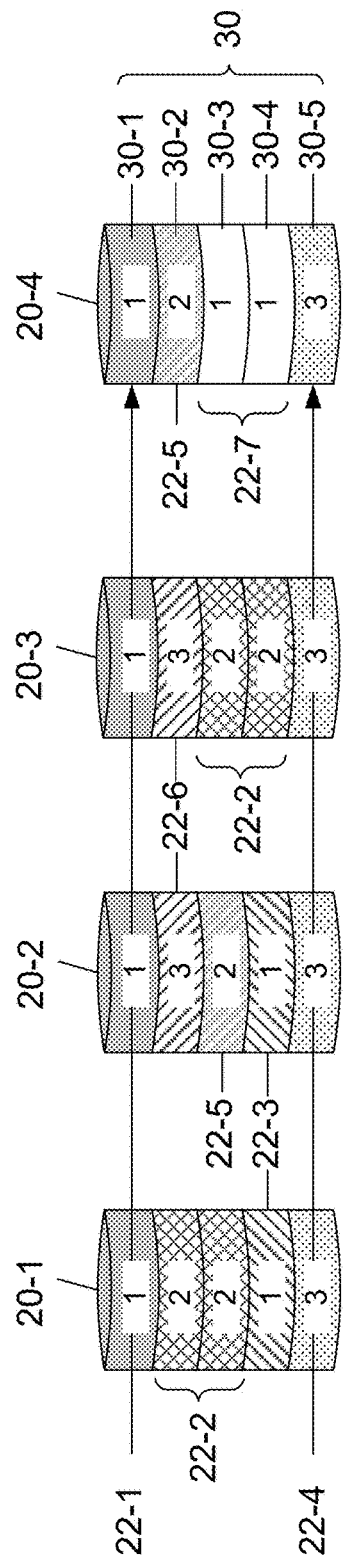
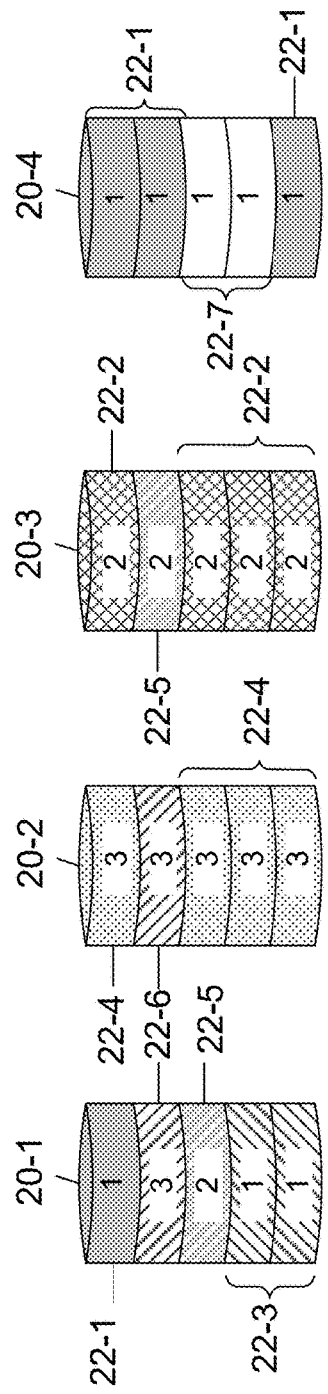
FIG. 2A
FIG. 2B

POWER SAVING MECHANISMS FOR A DYNAMIC MIRROR SERVICE POLICY

RELATED APPLICATIONS

This application is a divisional application claiming the benefit of the filing date of U.S. patent application Ser. No. 15/233,461, filed Aug. 10, 2016, entitled "Power-Saving Mechanisms for a Dynamic Mirror Service Policy," which is a continuation application claiming the benefit of the filing date of U.S. patent application Ser. No. 14/843,281, filed Sep. 2, 2015, entitled "Power-Saving Mechanisms for a Dynamic Mirror Service Policy," issued as U.S. Pat. No. 9,448,732 on Sep. 20, 2016, which is a continuation application claiming the benefit of the filing date of U.S. patent application Ser. No. 11/770,837, filed Jun. 29, 2007, entitled "Power-Saving Mechanisms for a Dynamic Mirror Service Policy," issued as U.S. Pat. No. 9,158,466, on Oct. 13, 2015, the contents of each of which is incorporated by reference herein in their entirety.

FIELD OF THE INVENTION

The present invention relates generally to storage systems. More particularly, the present invention relates to systems and methods for reducing power consumption in a storage system.

BACKGROUND

Data centers are continuously growing larger, their storage arrays ever expanding in number and in storage capacity. Usually, the data centers configure their storage arrays to operate at optimized input/output (I/O) performance and system response time. Often, though, little or no consideration is given to managing the overall power consumption of the storage system. Thus, the storage systems run continuously at their maximum power consumption. This continuous operation increases the total power dissipated and, consequently, the cost of ownership to the data centers.

SUMMARY

In one aspect, the invention features a method for reducing power consumption in a storage system having first and second physical disk drives providing mirroring. The method comprises placing the first physical disk into a power-saving mode of operation, while the second physical disk is in an active mode of operation responding to read and write requests. The first physical disk is transitioned from the power-saving mode of operation to an active mode of operation for destaging writes pending from cache to the first physical disk, while the second physical disk responds to read and write requests. The second physical disk is transitioned from the active mode to the power-saving mode of operation, while the first physical disk is in the active mode responding to read and write requests.

In another aspect, the invention features a storage system comprising cache, first and second physical disks configured for providing mirroring, and a disk adapter placing the first physical disk into a power-saving mode of operation while the second physical disk responds to read and write requests. The disk adapter transitions the first physical disk from the power-saving mode of operation to an active mode of operation for destaging writes pending from the cache to the first physical disk while the second physical disk responds to read and write requests, and transitions the second physical disk to the power-saving mode of operation while the first physical disk responds to read and write requests.

In still another aspect, the invention features a method for reducing power consumption in a storage system having first and second physical disk drives providing physical mirroring. The method comprises partitioning each of the first and second physical disks into upper and lower portions. The upper portion of the first physical disk is equal in size to the upper portion of the second physical disk, and the lower portion of the first physical disk is equal in size to the lower portion of the second physical disk. The first physical disk responds to read and write requests involving the upper portion of the first physical disk while the second physical disk responds to read and write requests involving the lower portion of the second physical disk. The first physical disk transitions to responding to read requests involving the lower portion of the first physical disk and to destaging writes pending in cache to the lower portion of the first physical disk, while the second physical disk transitions to responding to read requests involving the upper portion of the second physical disk and destaging writes pending in cache to the upper portion of the second physical disk

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

FIG. 2A is a diagram of an example of four storage disks in an array, each storage disk comprising a plurality of hypervolumes and each hypervolume being associated with a power profile.

FIG. 2B is a diagram of the four storage disks after the logical hypervolumes are rearranged to have those hypervolumes of the same power profile on the same storage disk.

DETAILED DESCRIPTION

In most storage arrays, approximately half of the power consumption is attributable to the operation of its disk drives. Capitalizing on the recognition that not every disk drive in a storage array is actively involved in I/O operations at the same time, the power optimization techniques of the present invention can reduce the power consumption of inactive disks.

In brief, a storage system practicing an embodiment of the present invention identifies which logical objects can be placed in a reduced power mode, and groups such logical objects onto a set of one or more physical disk drives. The storage system can then apply a power policy, predefined to achieve reduced power consumption, to this set. As a result, the physical disk drives in the set dissipate less, if any, power than if permitted to operate normally. By establishing physical disk drives that can transition to a reduced power consumption mode, the storage system can manage and optimize its overall power consumption. The result is lower cost of ownership to the customer. In addition, integration of the various power optimization techniques described herein with performance optimization techniques can achieve a desired level of balance between I/O performance and overall power consumption.

Figure 1:
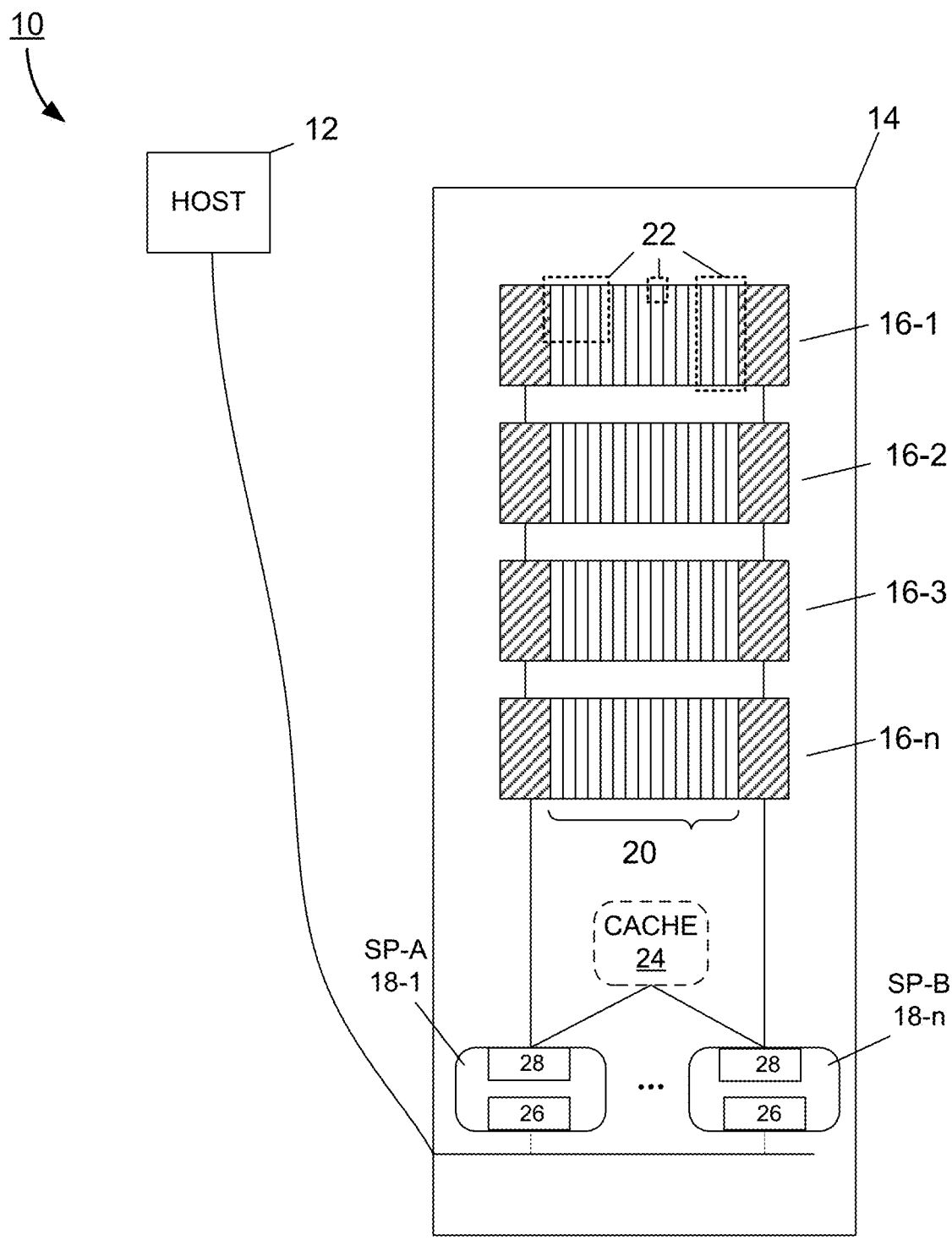
FIG. 1 is a diagram of an embodiment of a storage system implementing power optimization in accordance with the invention.

FIG. 1 shows an embodiment of a storage system 10 that can implement one or more of the various power optimization techniques described herein in accordance with the invention. The storage system 10 includes a host system 12 in communication with a storage array 14. The storage array 14 includes a plurality of disk array enclosures 16-1, 16-2, 16-3, 16-n (generally, 16) in communication with a plurality of storage processor enclosures 18-1, 18-n (generally, 18). Each disk array enclosure 16 includes a plurality of physical disk drives 20 for storing data. Each storage processor 18 includes a plurality of host adapters 26 (one of which is shown) for communicating with the host 12 and a plurality of disk adapters 28 (one of which is shown) for communicating with the disks 20. Although described primarily with respect to a single host 12 and a single storage array 14, the principles of the invention extend also to storage systems with multiple hosts and multiple storage arrays. Exemplary implementations of the storage array 14 include Symmetrix® and CLARiiON® storage arrays; both produced by EMC Corp. of Hopkinton, Ma.

The storage array 14 presents the physical disks 20 to the host 12 as logical volumes, herein called LUNs, originally a SCSI (small computer system interface) term, now commonly used to describe a logical unit of physical storage space. Other terms herein used synonymously with LUNs are logical devices, logical objects, or logical entities. A LUN 22 can map to one or more segments of a disk 20, to segments of multiple disks 20, or to multiple complete disks 20. Each segment comprises data blocks (a data block being the amount of memory written or read as a unit from the physical disk). Segments within a disk 20 or from disk to disk do not need to be of the same size. As used herein, a segment of a disk 20 may also be referred to as a hypervolume.

The host 12 runs application programs that generate I/O requests that include reading data from and writing data to the disk 20. When generating I/O requests, the applications address such requests to a particular LUN 22 and are unaware of the particular mapping of the LUN 22 to the physical disks 20. In one embodiment, the storage array 14 includes a cache 24 (dotted lines). When the host 12 issues a write command to the storage array 14, the storage processor 18-1 writes the data to the cache 24 and responds to the host 12 that the data have been written to disk 20. Thus, the host 12 receives notice faster than had the data actually been written to disk 20 prior to issuance of the response. Afterwards, the disk adapter 28 copies the data from cache 24 to disk 20 during a process referred to as destaging.

Associated with each LUN 22 are programmable attributes, including a power attribute. Information stored for the power attribute of a given LUN 22 identifies a power profile associated with that LUN 22. Associated with each different power profile is a power policy used to define a mode of operation for the disk 20 to which the LUN 22 maps. In general, the mode of operation defined by the power policy causes the disk 20 to dissipate less power. Whether the disk 20 operates in that defined mode of operation depends upon the power profiles associated with the other LUNs 22 mapping to that disk 20, as described in more detail below.

The power attribute information for a given LUN 22 can be set in various manners, including, but not limited to: (1) by default upon initial definition of the LUN 22; (2) by a storage administrator who issues commands to the LUN 22 through a command line interface or a graphical user interface to set their power attributes; and (3) by executing a host application (e.g., program code or script) that dynamically modifies the power attribute of the LUN 22 during the application's execution.

Examples of power profiles include, but are not limited to, the following: (1) power is always on to the disk 20 to which maps the LUN 22; (2) variable power is always on to the disk 20; and (3) power is selectively off to the disk 20.

The first of these exemplary power profiles, "always on", does not conserve power. In effect, the power policy for this power profile is to allow the disks to operate normally (i.e., to forego implementing any power saving measures that could affect performance). This power profile is appropriate for LUNs that store critical data or require maximum I/O performance and can be a default profile for storage systems in which power optimization is of secondary importance.

The second of these exemplary power profiles, "variable power", is appropriate when reduced performance for certain periods is acceptable for certain LUNs 22. Various power policies can be employed to disks 20 associated with a "variable power" power profile. For example, the disks 20 may have a reduced power mode (i.e., a designed feature) into which the disks enter automatically at scheduled periods. As another example, a target maximum power level can be defined for a given period, and disks 20 can enter a reduced performance (i.e., response time) mode that can be reduced to a degree necessary to achieve this target power level.

The third exemplary power profile, "selectively off", is appropriate when certain LUNs 22 can be taken offline (e.g., power off), for example, on demand or on a schedule. As used herein, power-off, power-down, spin-down, standby mode, and sleep mode are equivalent modes of operation in that the disk platter stops spinning in each mode. The modes of operation have some differences: in some of these modes, the disk electronics continue to receive power; in others, power to the disk electronics is off. When in any of these modes, the LUNs 22 can be brought online by explicit administrator actions or by I/O activity directed to the LUNs 22. Exemplary applications for which this power profile is appropriate include, but are not limited to, virtual tape libraries, and back-up applications.

An initial assignment of power profiles to LUNs 22 typically produces hypervolumes with heterogeneous power profiles on a single physical disk 20. FIG. 2A provides such an example of four disks 20-1, 20-2, 20-3, and 20-4 (generally, 20) with heterogeneous power profiles. As shown, each disk 20 is partitioned into segments or hypervolumes 30. The number of hypervolumes 30 for each disk 20 is merely illustrative; disks 20 may be partitioned into fewer or more hypervolumes. For example, each disk in an EMC Symmetrix storage arrays can have as many as 255 hypervolumes.

LUNs 22-1, 22-2, 22-3, 22-4, 22-5, 22-6, and 22-7 map to the hypervolumes 30 of the four disks 20. The shading in FIG. 2A and in FIG. 2B are for assisting in discerning which LUNs 22 map to which hypervolumes 30—hypervolumes 30 of like shading are part of the same LUN. For example, LUN 22-1 maps to the first hypervolume 30-1 of each disk 20-1, 20-2, 20-3, and 20-4. LUN 22-2 maps to the second and third hypervolumes 30-2, 30-3 of disk 20-1 and to the third and fourth hypervolumes 30-3, 30-4 of disk 20-3.

Based on the particular assignment of power profiles to LUNs 22 and on the particular mapping of such LUNs 22 to the hypervolumes 30 of the disks 20, each disk 20-1, 20-2, 20-3, and 20-4 can have hypervolumes 30 with heterogeneous (i.e., differing) power profiles. For example, the first and fourth hypervolumes 30-1, 30-4 of the disk 20-1 are associated with the power profile no. 1, the second and third hypervolumes 30-2, 30-3 with power profile no. 2, and the fifth hypervolume 30-5, with power profile no. 3.

For power management purposes, each disk 20 is treated as a whole; that is, although the hypervolumes 30 of a given disk 20 may have heterogeneous power profiles, that disk 20 and its hypervolumes operate according to a single power mode of operation. For example, a disk 20 having one hypervolume 30 associated with an "always on" power profile requires power to the disk 20 to be always on, even if the remaining hypervolumes of that disk 20 are associated with a "selectively off" power profile. In general, a power policy capable of accommodating the performance of all hypervolumes on the disk 20 is applied for those disks 20 with heterogeneous power profiles. If, for example, disk 20-1 has two hypervolumes with a "selectively off" power profile and three hypervolumes with a "variable power" power profile, the power policy applied to the disk would correspond to the "variable power" power profile. Alternatively, the "always on" power profile can be applied by default in all heterogeneous power profile situations (even if none of the hypervolumes has an "always on" power profiles) because applying power to the disk will accommodate the performance of all hypervolumes on the disk, irrespective of their power profiles, although at the loss of potential power savings. Thus, disks 20 having heterogeneous power profiles often cannot optimize power savings.

To improve optimization of power savings in the storage system 10, the storage processor 18 includes logic (microcode, program code, firmware, hardware, or combinations thereof) for grouping the hypervolumes 30 associated with the same power profile onto the same physical disk 20. FIG. 2B shows a remapping of the LUNs 22-1, 22-2, 22-3, 22-4, 22-5, and 22-6 to the disks 20-1, 20-2, 20-3, and 20-4 to group together hypervolumes having the same power profile. (The mapping of LUN 22-7 is unchanged in this illustration). As an example, as many hypervolumes 30 of LUN 22-1 as needed to produce a disk comprised of homogeneous power profiles (i.e., profile no. 1) have been mapped to disk 20-4. The displaced hypervolumes 30-2 and 30-5 of disk 20-4 map now to hypervolume 30-2 of disk 20-3 and to hypervolume 30-1 of disk 20-2, respectively. The remapping of hypervolumes 30 occurs to the extent needed to achieve a desired level of power optimization.

As shown, the remapping of LUNs 22 produces three of four disks having hypervolumes comprised of the homogeneous power profiles. For example, all hypervolumes of disk 20-2 are associated with power profile no. 3; all hypervolumes of disk 20-3 are associated with power profile no. 2; and all hypervolumes of disk 20-4 are associated with power profile no. 1. As a result, disk 20-4 is always on, disk 20-3 is placed into a variable power mode of operation, and disk 20-2 is placed into a selectively turned off mode of operation. After the remapping of the LUNs 22, disk 20-1 continues to have heterogeneous power profiles, the most accommodating of which being power profile no. 1, and is therefore always on.

Figure 3:
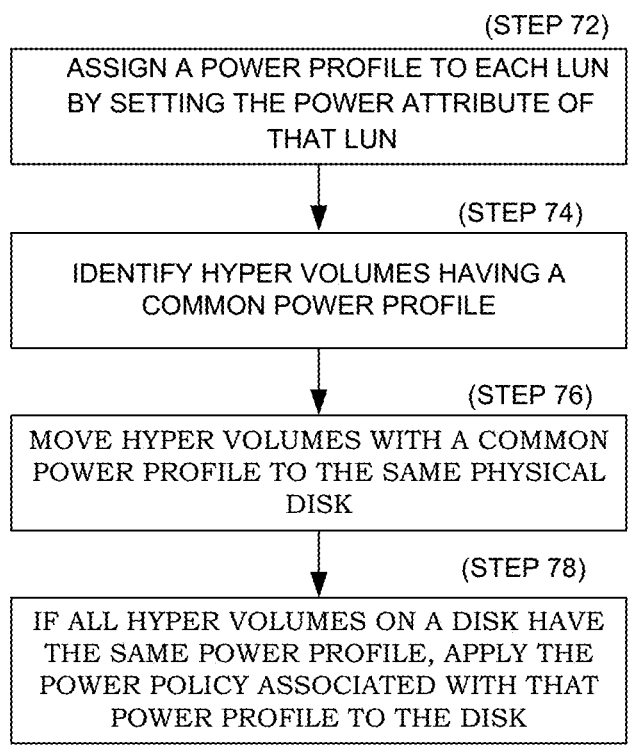
FIG. 3 is a flow diagram of an embodiment of a process for implementing power optimization in a storage system.

FIG. 3 shows an embodiment of a process 70 for implementing power optimization in the storage system 10. In the description of the process 70, reference is also made to FIG. 1 and FIG. 2. At step 72, each LUN 22 is assigned a power profile. These LUNs 22 map to the hypervolumes 30 of the physical disks 20. Logic executing at the disk adapter 28 identifies (step 74) hypervolumes 30 with the same power profile. Disk adapter logic changes (step 76) the mapping of the LUNs to the disks 20 to group hypervolumes 30 having the same power profile onto the same physical disk. If all hypervolumes 30 on a disk 20 have the same power profile, the power policy associated with that power profile is applied (step 78) to the disk 20. For example, if the power profile is "variable power" and the power policy is to place the disk 20 into a reduced performance mode of operation at a given time, the disk adapter 28 executes the power policy at the appointed time. For a disk 20 with heterogeneous power profiles, the disk adapter 28 selects the power policy that accommodates the performance of all hypervolumes 30 of that disk 20.

Grouping hypervolumes 30 associated with a given LUN 22 onto a particular disk 20 in order to increase power optimization can decrease I/O performance. For example, consider disk 20-4 after the remapping of the LUNs 22. If LUN 22-1 is a particularly active LUN, disk 20-4 can become a bottleneck for servicing I/O access requests. Accordingly, there can be some tradeoff between power optimization and I/O performance optimization: a storage array fully optimized for power conservation can have poor I/O performance and one fully optimization for I/O performance can have little or no power conservation. In one embodiment, power optimization and performance optimization techniques are integrated into a single process (i.e., within microcode, software, firmware, hardware or a combination thereof). Examples of techniques for optimizing performance in a storage system are described in U.S. Pat. No. 6,671,774, issued Dec. 30, 2003, to Lam et al., the entirety of which is incorporated by reference herein.

Figure 4:
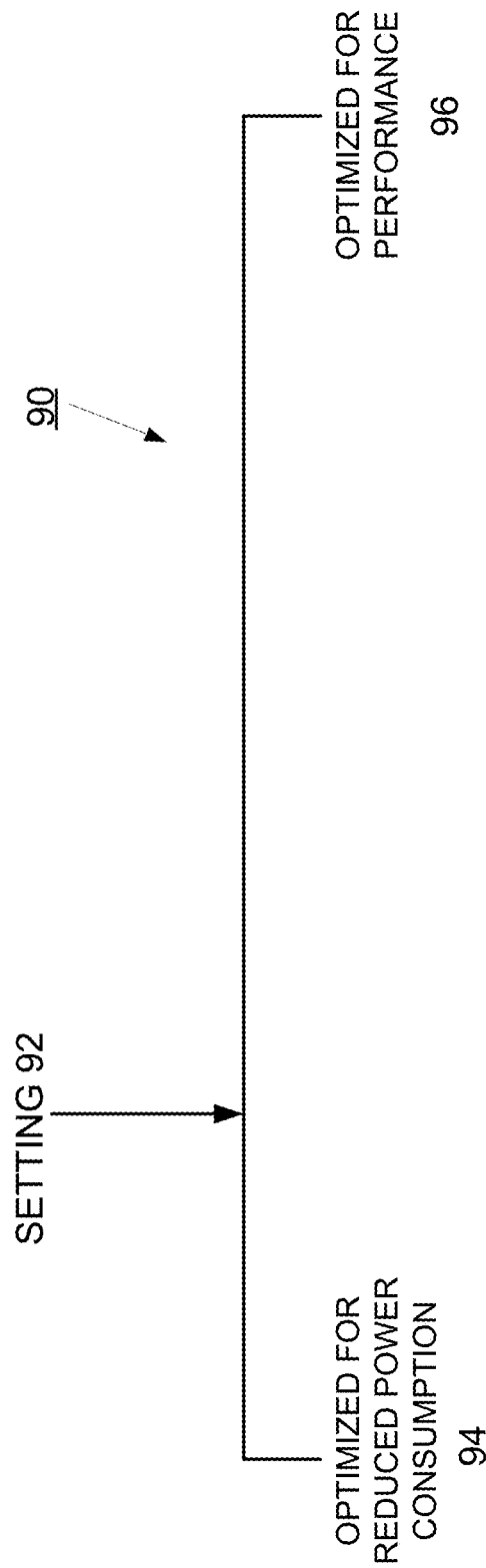
FIG. 4 is a diagram of a slider bar for illustrating a range of settings that can be used to achieve a desired balance between power optimization and system performance.

A mechanism that integrates power optimization techniques with performance optimization techniques can equip storage administrators with a tool to achieve a desired balance between power and performance optimization—the storage administrator can "dial in" the particular desired balance. A slider bar 90, as shown in FIG. 4 can illustrate such a mechanism for achieving this desired balance. A storage administrator can manipulate the setting 92 of the slider bar 90 by turning a dial (not shown) disposed on the storage array 14. One end 94 of the slider bar 90 represents an integrated process fully optimized for power consumption. The opposite end 96 of the slider bar 90 represents an integrated process fully optimized for performance.

Figure 5:
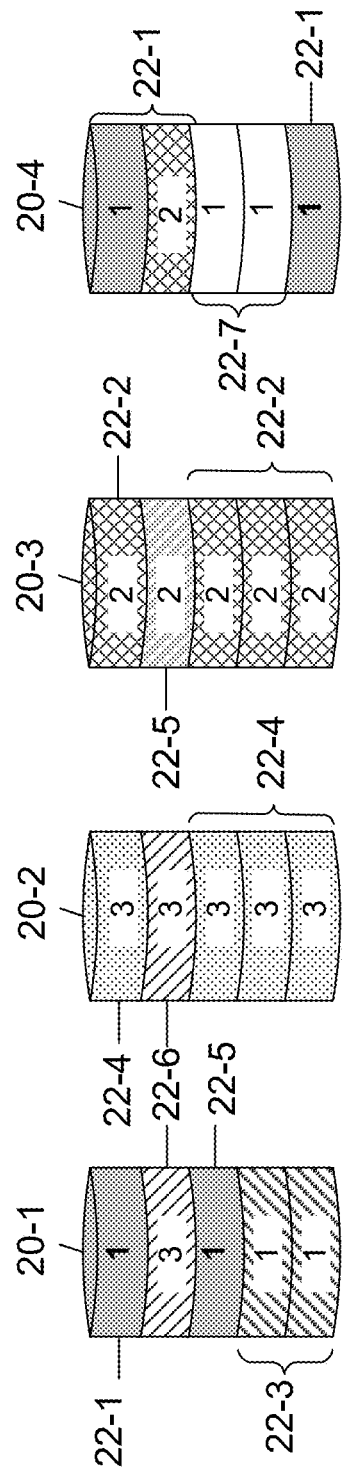
FIG. 5 is a diagram of the four storage disks of FIG. 2B illustrating another exemplary rearrangement of hypervolumes.

Between both ends 94, 96 of the slider bar 90 are various settings that achieve different balances between power optimization and performance optimization. Setting 92, for example, illustrates a particular balance more favorable to reducing power consumption than to increasing system performance. Conversely, such a setting 92 is more favorable to system performance than to a setting that fully optimizes for power consumption. For instance, applying setting 92 to the disks 20-1, 20-2, 20-3, 20-4 might produce the remapping of LUNs to disks as shown in FIG. 5. This remapping reduces the potential bottleneck at disk 20-4 by redistributing LUN 22-1 more evenly between disks 20-1 and 20-4 than the distribution of FIG. 2B, and thus is more favorable for performance than that of FIG. 2B (although not necessarily less favorable for power optimization).

Although described previously with respect to managing power at the level of individual disks 20 in an enclosure 16, the process of grouping hypervolumes into homogeneous groups on individual disks also extends to grouping homogeneous sets of hypervolumes onto sets of physical disks. Disks in a storage array are often organized and treated as sets, especially RAID arrays. To place each disk in a set into the same power-saving mode, all disks in the set need to be assigned to the same power profile.

For example, consider a set of disks organized into a RAID-5 array configuration, where data and parity information are striped across all physical disks in the set. In this RAID-5 array, a LUN can map to a segment or to the entirety of each disk within the set. To place the RAID-5 array into a power-saving mode (e.g., "variable power" or "selectively off") requires that each disk in the set be assigned the same power profile. Grouping homogeneous sets of hypervolumes onto sets of physical disks can achieve this result.

Figure 6:
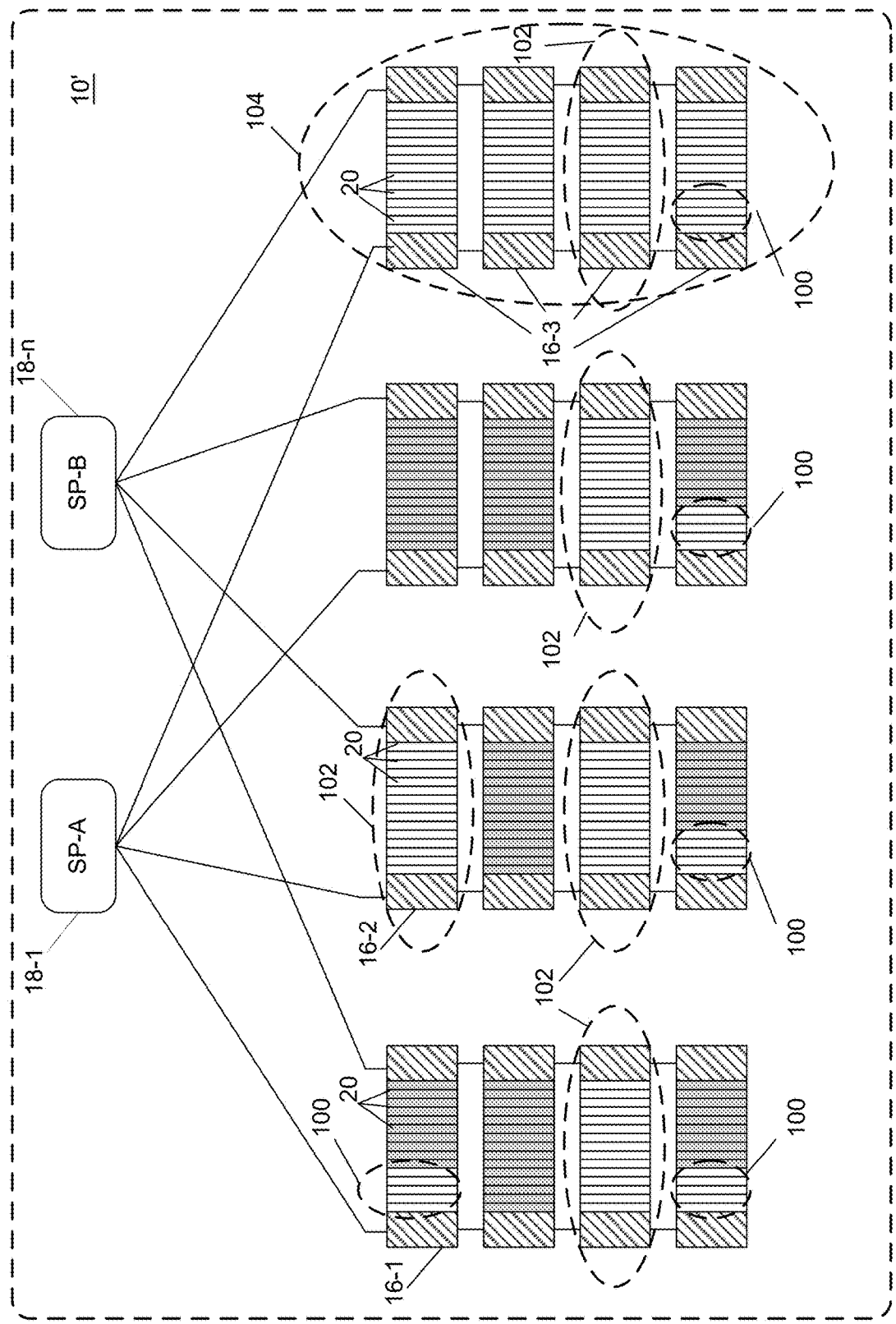
FIG. 6 is a diagram of various types of power profile groupings that can be attained by rearranging like power profiles on like storage disks.

The grouping of homogeneous hypervolumes, individually or in sets, onto individual or sets of disks can lead to homogeneous enclosures and to homogeneous storage arrays. FIG. 6 shows various types of power profile groupings that can be obtained to expand the scale of power optimization to entire enclosures and entire storage arrays. One type of grouping 100, shown encircled by dotted lines, illustrates power management at the level of the disk drives 20. For this type of grouping, a power-saving policy can be applied to fewer than all disks 20 (unshaded) within a single enclosure 16-1.

Another type of grouping 102 represents an entire enclosure 16-2 that can be subject to a common power-saving policy because every disk 20 in the enclosure 16-2 is comprised fully of hypervolumes associated with the same power profile. For example, the power-saving policy for the entire enclosure 16-2 can be to turn the enclosure selectively off and on at scheduled times.

Still another type of grouping 104 represents an entire storage array that can be subject to a power-saving policy because every enclosure 16-3 of that storage array 14 is comprised fully of disks 20 associated with the same power profile. An example of this power-saving policy is one that places the storage array, its enclosures, and disks, into a reduced response time mode of operation. Conceivably, all of the storage arrays of the storage system 10' can be subject to a common power-saving policy because every storage array is associated with the same power profile. In such a storage system, every disk 20 can run, for example, in a reduced-power mode, if this is the particular power-saving policy associated with the specified power profile.

Seek Distance Minimization

Study of disk power consumption finds that the amount of power consumed is proportional to the average seek distance for I/O access requests. Generally, disks have their own seek minimization techniques. In the storage array, disk adapters recognize and use hypervolumes in disks and, thus, each hypervolume may receive I/Os from the disk adapters. As a result, the disk head usually strokes the full address range of the disk despite the disks' own seek minimization techniques. Accordingly, one class of power-saving policies shorten the average seek distance across a hypervolume by exploiting this understanding of how the storage array uses its disk drives.

One embodiment of a power-saving policy in this class reduces seek distances during the write destaging process. As previously described, write requests issued by the host 12 are first stored in the cache 24 where such writes, referred to as writes pending (WP), await subsequent destaging to the physical disks 20. To identify a WP for destaging, the disk adapter 28 searches for mature cache slots that have resided in the cache 24 beyond a predefined threshold period (e.g., using a WP delay parameter). In general, the slots are kept in the cache 24 for a predefined short period to ensure that rewrites coming during that period can be buffered in the cache 24. This buffering enables writes to coalesce so that multiple consecutive host writes are destaged to disk as a single large write request. These mechanisms thus reduce the I/O activity to the disks. Typically, though, while searching for mature WP cache slots, the disk adapter 28 can distribute the I/O activity over the entire hypervolume and, if all hypervolumes of the disk are actively writing, over the entire disk. The result can be seek distances that stroke the entire hypervolume or disk.

One embodiment of a power-savings policy is to cause the disk adapter 28 to operate in a special mode of operation; thereby executing linear destaging and achieving short seek distances. This can be accomplished by reducing the value of the WP delay parameter significantly. The shortened WP delay causes the disk adapter 28 to find WPs for writing to the hypervolume within a short address range because the search for mature slots will usually be able to find a write to perform on the same or on a neighboring cylinder of the disk.

Other techniques for shortening seek distances include the following: (a) sweep scheduling for disks; (b) limiting the address range during the destaging process; and (c) writing to the last volume read. Although described herein as examples of power-saving policies that can be used in conjunction with power profiles, each of these power-saving techniques for shortening seek distances can be implemented in storage systems independently of the above-described power optimization involving power profiles and power-saving policies.

In brief, the sweep-scheduling technique schedules I/O operations so that the arm of the disk drive sweeps across the disk in one direction and then in the reverse direction (rather than zigzagging across the disk in accordance with the addresses of unscheduled I/O requests). In addition, the sweep-scheduling technique issues I/O commands to a limited area on the disk. The combination of these scheduling criteria tends to shorten seek distances.

In addition to maintaining a pending list of I/O requests (a list of I/Os that are pending for the disk), the sweep-scheduling technique maintains a hold list. The hold list includes I/O requests that have been deferred (to be issued later) in order to achieve the above-described I/O scheduling criteria.

The sweep-scheduling technique also maintains a record of the sweep direction (i.e., the current direction of the sweep across the disk). Examples of values for recording the sweep direction include "UP", for representing an increasing offset (i.e., address), and "DOWN", for representing a decreasing offset. Either UP or DOWN can serve as the default value for the sweep direction parameter.

Other parameters maintained by the sweep-scheduling technique include an upper bound parameter and a lower bound parameter. The upper and lower bound parameters are used for identifying the I/O requests in the pending list that have the largest and smallest offsets (addresses), respectively. The default values for both parameters are equal to −1. Another maintained parameter is referred to as the "write destage range", and represents a limited address range for writes during the destaging process. In one embodiment, the unit is in Gb, and the default value is 8 Gb.

Figure 7A:
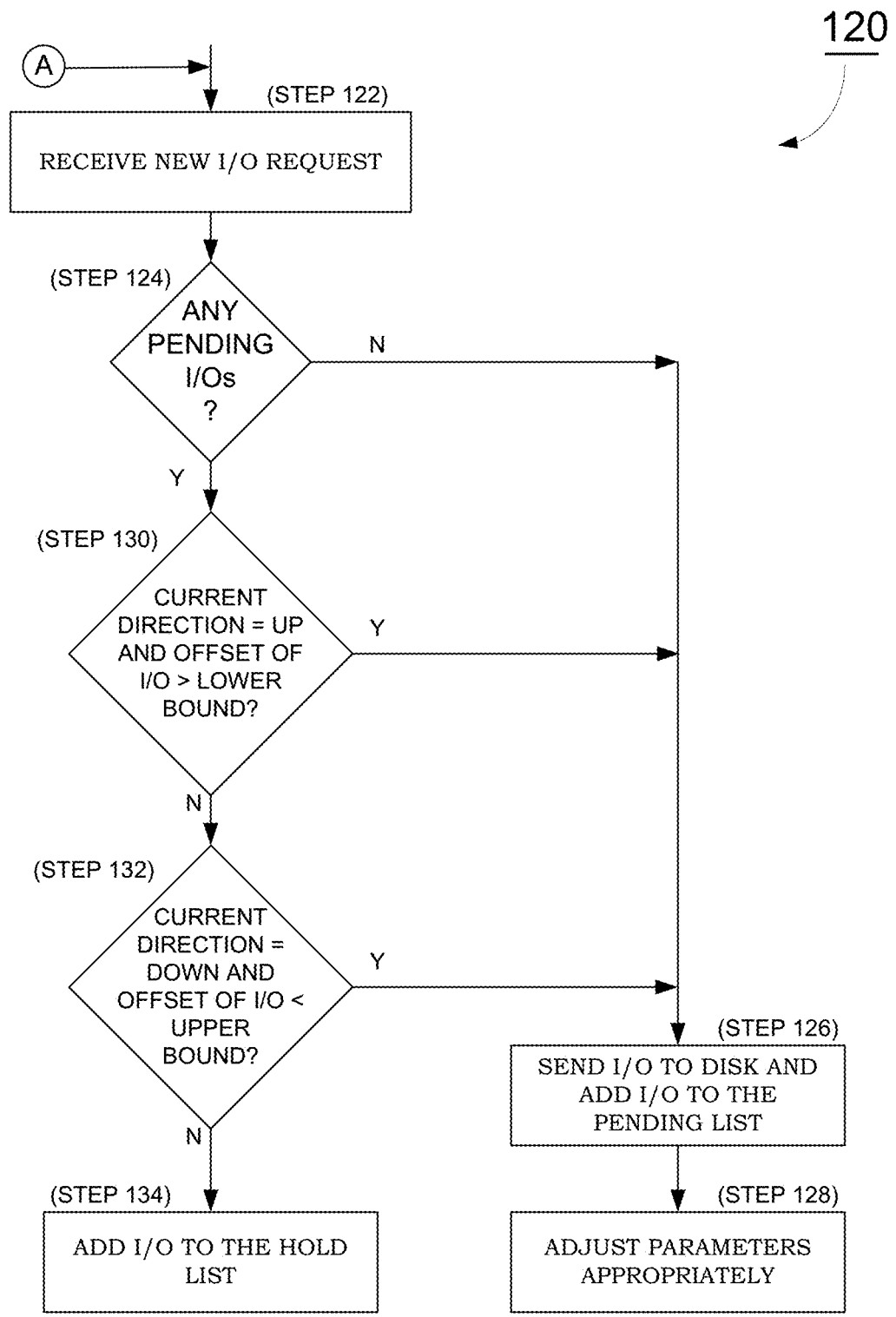
FIG. 7A and FIG. 7B are flow diagrams illustrating an embodiment of a process for shortening seek distances as a mechanism for reducing power consumption by the disk drives.
Figure 7B:
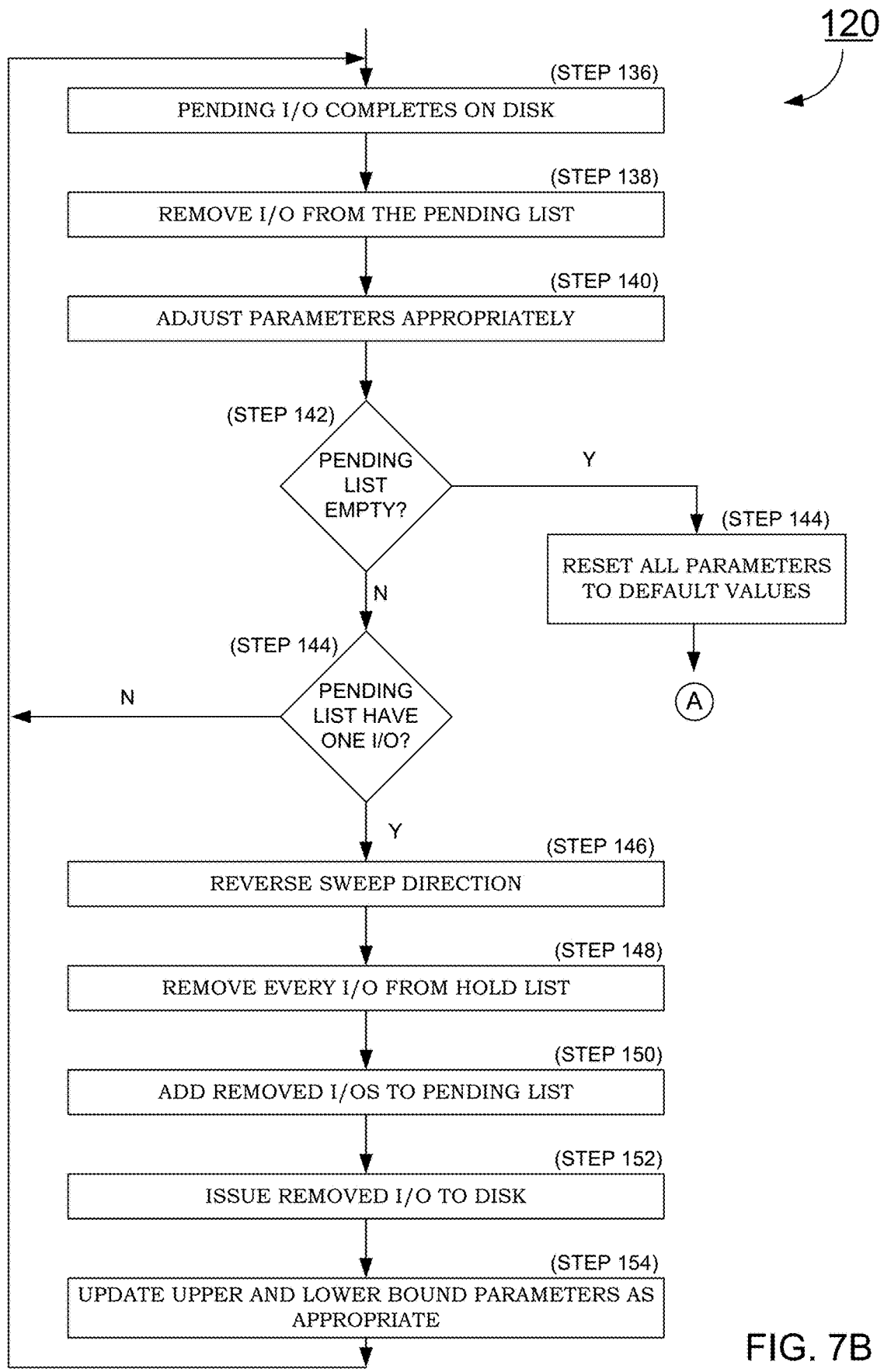

FIG. 7A and FIG. 7B show a process 120 for shortening seek distances in accordance with one embodiment of the invention. FIG. 7A illustrates the general operation of the process 120 when the storage processor 18 receives a new I/O operation; and FIG. 7B illustrates the general operation of the process 120 when an I/O request completes on a disk.

At step 122, the storage processor 18 receives a new I/O operation directed to a given disk. The disk adapter 28 of the storage processor 18 examines (step 124) the pending list to determine if any I/Os are currently pending at that disk. If the pending list is empty of I/O requests, the disk adapter 28 sends (step 126) the I/O request to the disk immediately and adds the I/O request to the pending list. The disk adapter 28 initializes (step 128) the lower and upper bound parameters to the offset of this pending I/O request and sets the sweep direction parameter to the default value.

If, at step 124, the pending list includes one or more pending I/Os, the disk adapter 28 examines (step 130) the sweep direction parameter and compares the offset of the I/O with the lower bound parameter. If the direction is "up" and the offset of the I/O request is greater (step 132) than the value of the lower bound parameter, the offset of this I/O request is consistent with the current sweep direction (i.e., ahead of the arm movement in the current sweep direction). Accordingly, the disk adapter 28 issues (step 126) the I/O request to disk, adds the I/O request to the pending list, and, if necessary, updates (step 128) the value of the upper bound parameter.

If instead, at step 130, the current sweep direction is "down" or the offset of the I/O is less than the lower bound, the disk adapter 28 determines (step 132) whether the sweep direction is down and compares the offset of the I/O with the upper bound parameter. If the direction is "down" and the offset of the I/O is less than the value of the upper bound parameter, the disk adapter 28 issues (step 126) the I/O to disk, adds the I/O to the pending list, and, if necessary, updates (step 128) the value of the lower bound parameter. The offset of this I/O request is consistent with the current "down" sweep direction.

If the newly received I/O operation does not pass the comparisons of either step 130 or step 132, the offset of the I/O request is not consistent with the current sweep direction and the disk adapter 28 places (step 134) the I/O request onto the hold list.

Referring now to FIG. 7B, when, at step 136, a pending I/O request completes on the disk, the disk adapter 28 removes (step 138) the I/O request from the pending list and updates (step 140) the upper and lower bound parameters, if appropriate.

If removing the completed I/O from the pending list causes the pending list to become empty (step 142), the disk adapter 28 resets (step 144) all parameters to their default values. If, instead, removing the completed I/O from the pending list causes the number of I/O requests in the pending list to become equal to one (step 144), the disk adapter 28 reverses (step 146) the sweep direction (i.e., changes the sweep direction from "up" to "down" or from "down" to "up"). The disk adapter 28 also removes (step 148) every I/O request from the hold list, adding (step 150) such I/O requests to the pending list, and issuing (step 152) such I/O requests to disk. The disk adapter 28 updates (step 154) the upper and lower bound parameters as appropriate.

Figure 8:
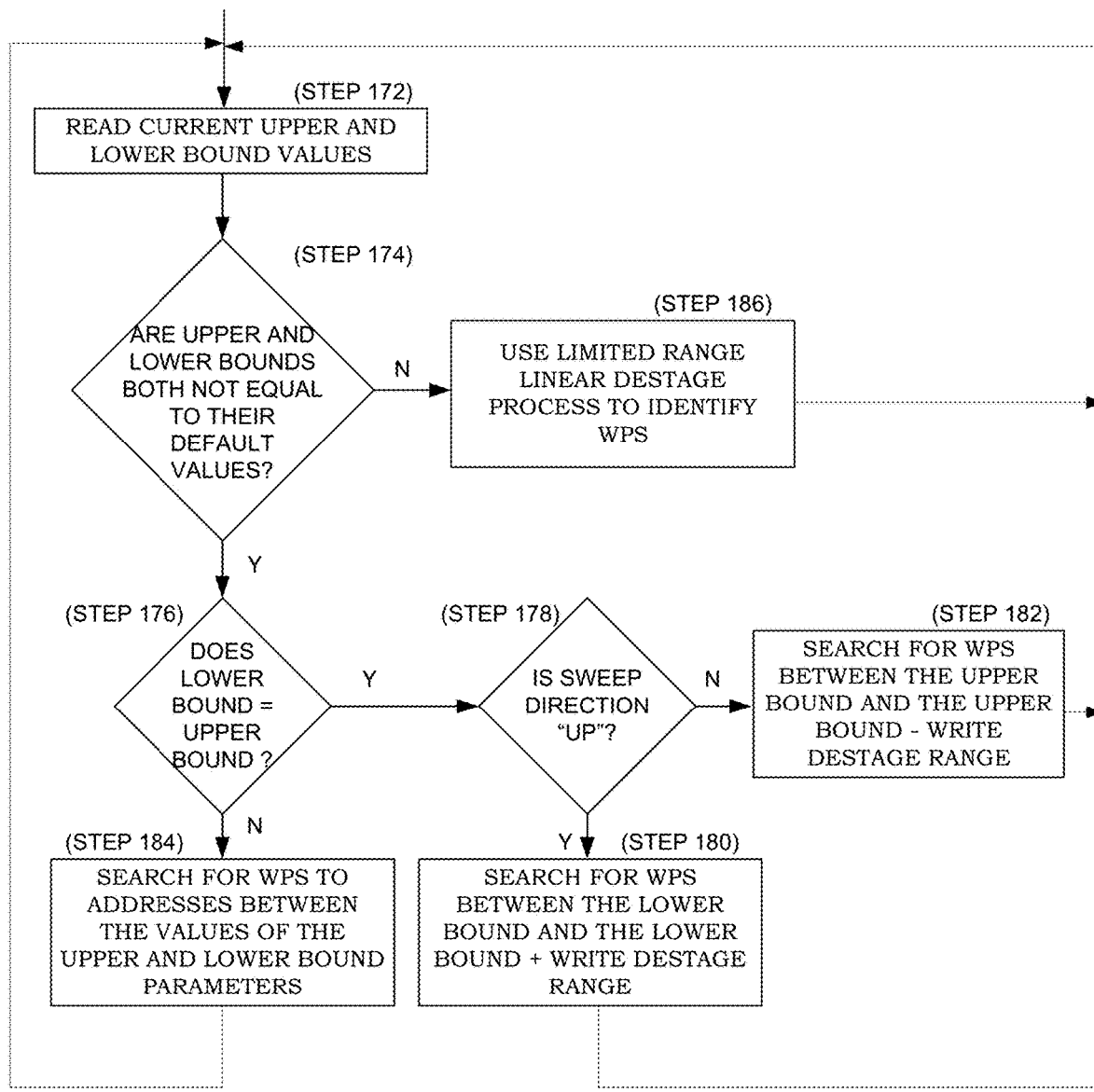
FIG. 8 is a flow diagram illustrating an embodiment of a process for reducing power consumption by the disk drives by limiting an address range when destaging writes pending from cache.

The second above-listed technique for shortening seek distances (i.e., limiting the address range during destaging) uses the upper and lower bound parameters for defining a range of addresses within which to look for WPs in the cache 24. Referring now to FIG. 8, shown is an embodiment of a process 170 that uses the upper and lower bound parameters during the destaging process. At step 172, the disk adapter 28 reads the values of the upper and lower bound parameters and determines (step 174) whether both parameters have changed from their default values (i.e., no longer equal to −1).

If both values have changed from their default value, the disk adapter 28 determines (step 176) whether the value of the lower bound parameter is equal to the upper bound. If the lower and upper bounds are equal, the disk adapter 28 determines (step 178) the sweep direction. If the sweep direction is "up", the disk adapter 28 searches (step 180) for WPs between the lower bound and the sum of the lower bound and the write destage range (Lower Bound <x<Lower Bound+Write Destage Range). If the sweep direction is "down", the disk adapter 28 searches (step 182) for WPs between the upper bound and the difference between the upper bound and the write destage range (Upper Bound >x>Upper Bound−Write Destage Range). Accordingly, the write destage range parameter serves to provide an address bound when the lower and upper bounds are the same.

If the lower and upper bounds are not equal to each other, the disk adapter 28 can then use them to define an address range within which to look for WPs. The disk adapter 28 searches (step 184) for WPs in cache that have offsets falling between the upper and lower bounds. If, at step 174, one or both of the upper and lower bound parameters is equal to it default value, then the disk adapter 28 performs (step 186) the linear destage process, described above, to find a WP in cache for destaging to disk. The process 170 continues until the disk exits the power-saving mode.

The third above-listed technique for shortening seek distances, the write-to-the-last-volume-read technique, provides an alternative mechanism to the sweep-scheduling technique. In brief overview, when destaging WPs from cache to physical disk, the disk adapter 28 identifies the last read hypervolume. The disk adapter 28 then searches the cache slots for a WP that is to be written to that particular hypervolume and writes the WP to the physical disk.

Because the last read caused the read/write head to be located over that hypervolume, the seek distance for writing the WP to the hypervolume should be shortened.

If no reads to a physical disk have occurred for a predetermined period (e.g., 5 seconds), the disk adapter 28 identifies the hypervolume with the most writes pending, treats that hypervolume to be last read hypervolume, and writes the WPs to the disk. If the disk adapter 28 enters a high-priority destaging mode, the write-to-the-last-volume-read technique can be temporarily disabled.

Power-Saving Extensions to the Dynamic Mirror Service Policy

U.S. Pat. No. 6,954,833, issued Oct. 11, 2005 to Yochai et al., the entirety of which is incorporated by reference herein, describes a process, referred to as Dynamic Mirror Service Policy or DMSP, for reducing seek times for mirrored logical volumes. Various power-saving extensions to DMSP, described herein, extend the mirror service policy to consider write requests (in addition to read requests). Accordingly, the power-saving techniques are available to those systems that have RAID-1 protected volumes and disks. Each of these power-saving extensions to DMSP can be implemented in storage systems independently of or in cooperation with the above-described power optimization techniques involving power profiles and power-saving policies.

In brief, the power-saving extensions to DMSP include: (1) placing one of the disks of a RAID-1 pair into standby mode (also, power-down, power-off, spin down, sleep mode); (2) placing one of the disks of a RAID-1 pair into idle mode; and (3) splitting disks of a RAID-1 pair and restricting seeks to one-half of the disk.

Figure 9:
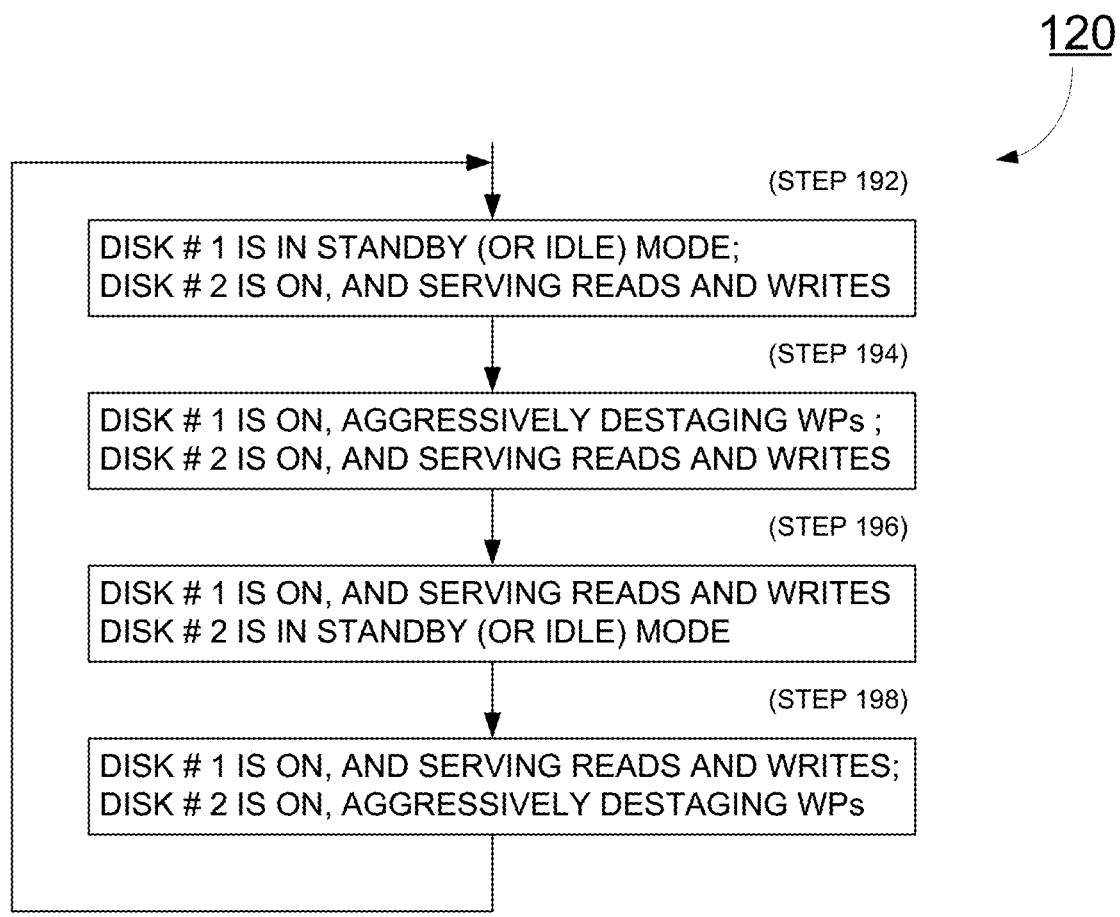
FIG. 9 is a flow diagram illustrating an embodiment of a process for reducing power consumption by the disk drives by placing one of a mirrored pair of disk drives into a standby mode or idle mode at certain times of a destaging process.
Figure 10:
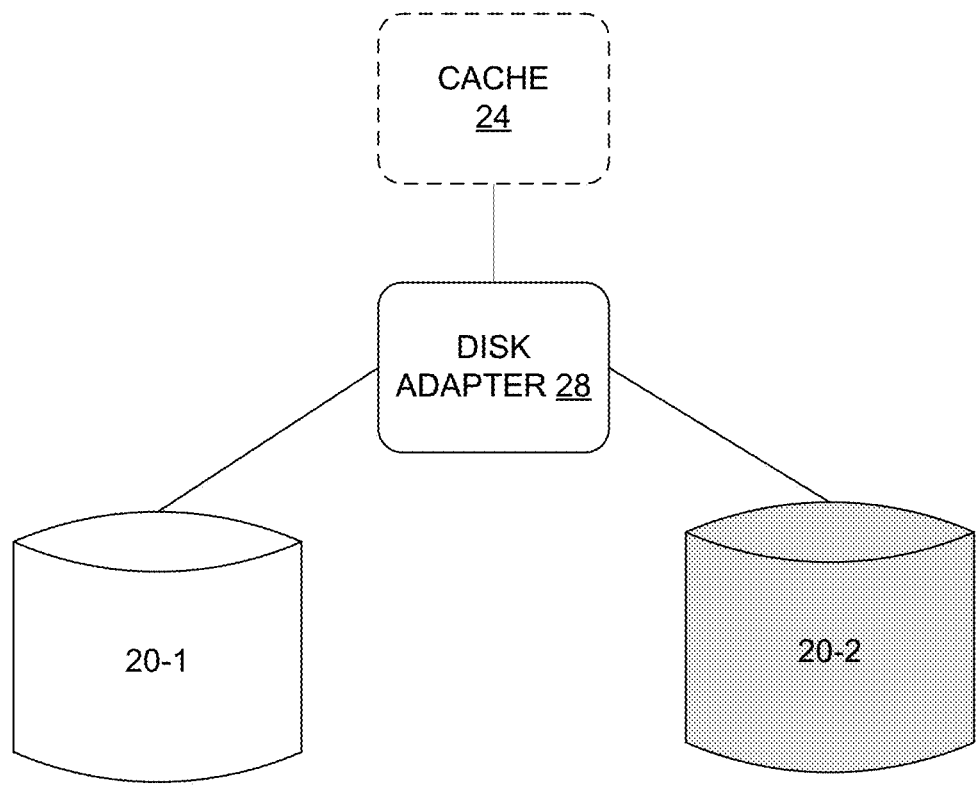
FIG. 10 is a diagram illustrating the mirrored pair of disks described in the process of FIG. 9.

FIG. 9 shows an embodiment of a process 190 performed during a destaging process in order to reduce power consumption by the disk drives. In the description of the process 190, reference is made to FIG. 10, which illustrates a RAID-1 pair of disks 20-1, 20-2 upon which the process 190 operates. When implementing this process 190 as a power-saving technique, physical mirroring is preferred for the disks 20-1, 20-2, although it is not necessary. Disks that are physical mirrors have the same set of mirrored logical volumes. As another preferred condition, RAID-5/6 should not be mixed with RAID-1 on the same physical disks 20-1, 20-2. The process 190 can operate with non-physical mirroring disks or in conjunction with RAID-5/6 implementation, but with increased complexity.

At step 192, disk 20-1 is placed in standby mode (i.e., the disk 20-1 is spun down). Disk 20-2 is on (spinning) and actively servicing read and write requests while writes pending for disk 20-1 accumulate in the cache 24. When a sufficiently large number of writes pending are in the cache 24, disk 20-1 is spun up (step 194) and placed into an "aggressive" destage mode. Disk 20-2 continues to actively service reads and writes.

One consideration when implementing the power-saving process 190 is to determine the duration (e.g., on the scale of seconds) for which the disk remains in the standby mode. In order to net a power savings, the duration in standby mode should be long enough for the power saved to exceed the extra power consumed by spin-up (i.e., because spin-up requires more power than normally required by the disks to continuously spin).

After the number of writes pending for disk 20-1 drops below a defined threshold, the read workload switches from disk 20-2 to disk 20-1. More specifically, disk 20-1 transitions (step 196) to servicing read and write requests, while disk 20-2 enters standby mode (i.e., is spun down).

Now when a sufficiently large number of writes pending accumulate in the cache 24 for disk 20-2, the disk adapter 28 spins up (step 198) and places disk 20-2 into an aggressive destage mode while disk 20-1 continues to service read and write requests. This cycling between standby mode and active mode and switching between disk 20-1 and 20-2 for servicing I/O requests continues until the disks 20-1, 20-2 exit this power-saving mode.

A variation of process 190 that the disk adapter 28 can perform during a destaging process places the disks 20-1, 20-2 into idle mode, instead of into standby mode. In the idle mode, power is applied to the disk so that its platters can spin, but the read/write heads are parked (not moving). This variation may achieve less power savings than process 190, but has advantages over process 190 in that a disk in idle mode can become ready for destaging WPs more quickly than a disk that is in standby mode. In addition, cycling a disk between idle mode and active mode causes less "wear and tear" on the disk than cycling between standby mode and active mode.

Figure 12:
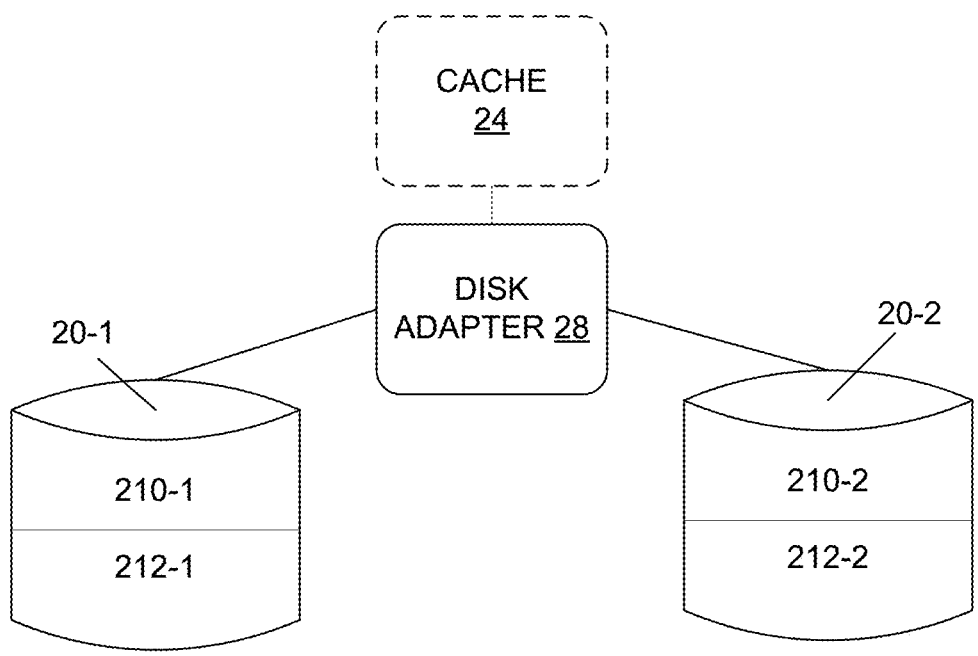
FIG. 12 is a diagram illustrating the mirrored pair of disks described in the process of FIG. 11.
Figure 11:
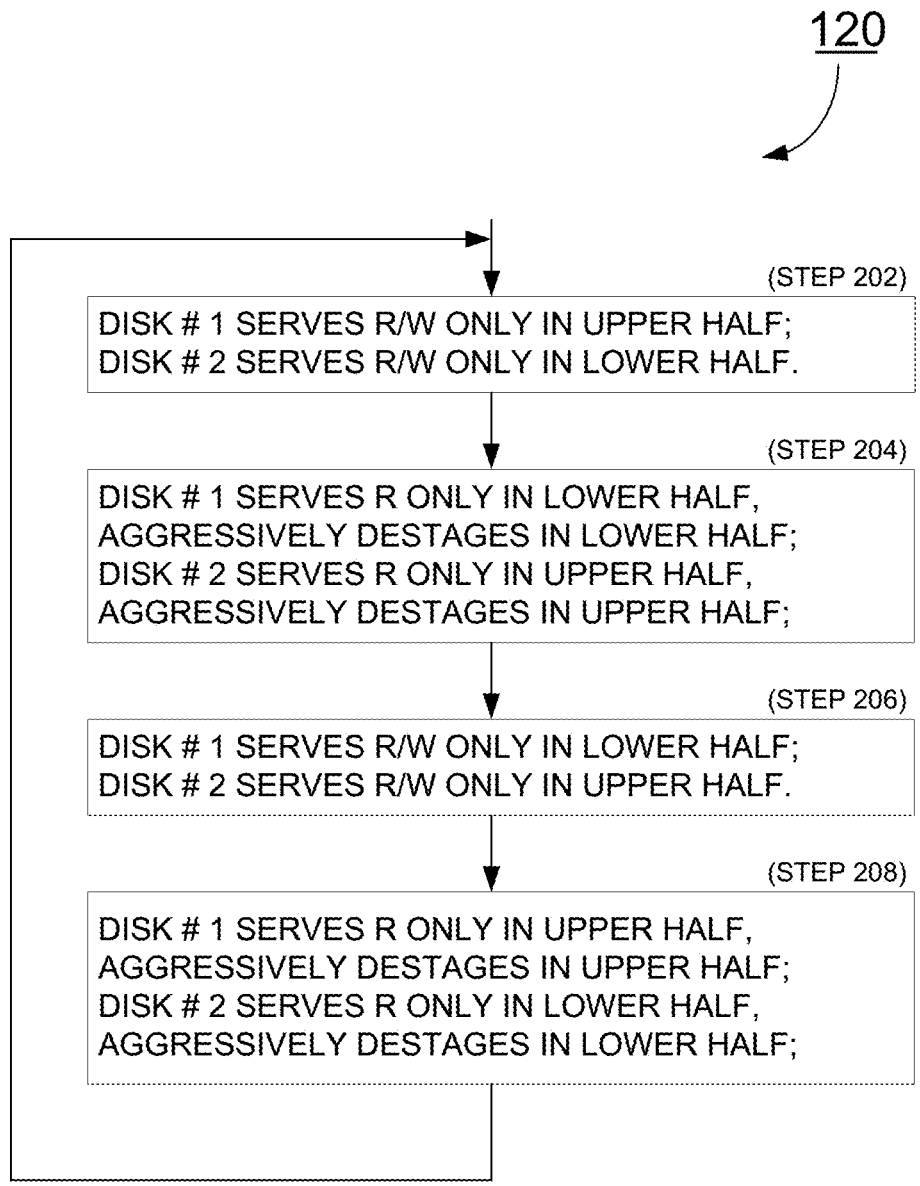
FIG. 11 is a flow diagram of an embodiment of a process for reducing power consumption by the disk drives by dividing each disk drive of a mirrored pair into halves and having each disk drive operate within one half of that disk, thus placing a limit on the range of addresses accessed by the disk drive and, consequently, shortening seek distances.

FIG. 11 and FIG. 12 illustrate an alternative process 200 for saving power by shortening seek distances during destaging. FIG. 12 shows the RAID-1 pair of disks 20-1, 20-2, each being split into halves. The halves of disk 20-1 are 210-1, 212-2; those of disk 20-2 are 210-2, 212-2. Each disk 20-1, 20-2 handles reads and writes from its assigned half of the disk 20-1, 20-2, as described below. With this technique, movement of the disk head is limited to one-half of the full disk stroke.

Referring to FIG. 11, at step 202 disk 20-1 serves read and write requests in its upper half 210-1 only, while disk 20-2 serves read and write requests in its lower half 212-2 only. When the time to destage arrives, at step 204 disk 20-1 serves reads only in its lower half 212-1 and aggressively destages in its lower half 212-1, while disk 20-2 serves reads in its upper half 210-2 only and aggressively destages in its upper half 210-2.

After destaging, disk 20-1 serves (step 206) read and write requests in its lower half 212-1 only, while disk 20-2 serves (step 206) read and write requests in its upper half 210-2 only. When the time to destage arrives again, the disks 20-1, 20-2 each destages to that half of the disk not previously destaged to. More specifically, at step 208, disk 20-1 serves reads in its upper half 210-1 only and aggressively destages in the upper half 210-1, while disk 20-2 serves reads in its lower half 212-2 only and aggressively destages in the lower half 212-2. This switching between upper and lower halves by the disk 20-1 and 20-2 continues until the disks 20-1, 20-2 exit this power-saving mode.

Although described with respect to upper and lower halves of disks, the principles of this power-saving process 200 extend generally to upper and lower portions of different sizes (e.g., an upper one-third portion and a complementary lower two-thirds portion).

Aspects of the present invention may be embodied in hardware, firmware, or software (i.e., program code). Program code may be embodied as computer-executable instructions on or in one or more articles of manufacture, or in or on computer-readable medium. A computer, computing system, or computer system, as used herein, is any programmable machine or device that inputs, processes, and outputs instructions, commands, or data. In general, any standard or proprietary, programming or interpretive language can be used to produce the computer-executable instructions. Examples of such languages include C, C++, Pascal, JAVA, BASIC, Visual Basic, and Visual C++.

Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof. The computer-executable instructions may be stored as, e.g., source code, object code, interpretive code, executable code, or combinations thereof. Further, although described predominantly as software, embodiments of the described invention may be implemented using hardware (digital or analog), firmware, software, or a combination thereof.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for reducing power consumption in a storage system, including reducing a seek distance during a destaging process, comprising:
   receiving, by a storage processor of the storage system, a new input/output (I/O) operation request directed to a disk in a storage array of the storage system;
   examining a pending list to determine if the pending list includes I/O requests pending for the disk;
   in response to determining that the pending list includes I/O requests pending for the disk, determining if a current sweep direction is up and an offset of the I/O request is greater than a lower bound parameter, or if the current sweep direction is down and the offset of the I/O request is less than an upper bound parameter; and
   adding the new I/O operation request to a hold list in response to a determination that the offset of the I/O request is not consistent with the current sweep direction and not between the upper bound parameter and the lower bound parameter.

2. The method of claim 1, wherein in response to examining the pending list a determination is made that the pending list is empty of I/O requests, the new I/O operation request is sent to the disk and added to the pending list.

3. The method of claim 1, further comprising adding the new I/O to the pending list in response to a determination that the current sweep direction is up and an offset of the I/O request is greater than a lower bound parameter or the current sweep direction is down and the offset of the I/O request is less than an upper bound parameter.

4. The method of claim 1, further comprising:
   completing a pending I/O request on the disk;
   removing the I/O request from the pending list;
   determining whether the pending list is empty or has at least one I/O request pending for the disk; and
   reversing the current sweep direction.

5. The method of claim 4, further comprising:
   removing every I/O request from the hold list; and
   adding the every I/O request to the pending list.

6. The method of claim 1, wherein the upper bound parameter and the lower bound parameter used during the destaging process include:
   reading current upper and lower bound values;
   determining whether the current upper and lower bound values each changed from a default value;
   using a limited range linear destaging process to identify writes pending in cache for destaging to the disk in response to determining that the current upper and lower bound values did not change from the default value; and
   searching for writes pending between the upper bound parameter and the lower bound parameter in response to determining that the current upper and lower bound values changed from the default value and further in response to a determination that the upper bound parameter is different than the lower bound parameter.

7. The method of claim 6, further comprising:
   determining a sweep direction in response to a determination that the upper bound parameter is the same as the lower bound parameter.

8. A method for reducing power consumption in a storage system, including reducing a seek distance during a destaging process, comprising:
   receiving, by a storage processor of the storage system, a new input/output (I/O) operation request directed to a disk in a storage array of the storage system;
   examining a pending list to determine if the pending list includes I/O requests pending for the disk;
   in response to determining that the pending list includes I/O requests pending for the disk, determining if a current sweep direction is up and an offset of the I/O request is greater than a lower bound parameter, or if the current sweep direction is down and the offset of the I/O request is less than an upper bound parameter; and
   adding the new I/O operation request to a hold list in response to a determination that the offset of the I/O request is not consistent with the current sweep direction and not between the upper bound parameter and the lower bound parameter, wherein the upper bound parameter and the lower bound parameter used during the destaging process include:
   reading current upper and lower bound values;
   determining whether the current upper and lower bound values each changed from a default value;
   using a limited range linear destaging process to identify writes pending in cache for destaging to the disk in response to determining that the current upper and lower bound values did not change from the default value; and
   searching for writes pending between the upper bound parameter and the lower bound parameter in response to determining that the current upper and lower bound values changed from the default value and further in response to a determination that the upper bound parameter is different than the lower bound parameter.

9. The method of claim 8, wherein in response to examining the pending list a determination is made that the pending list is empty of I/O requests, the new I/O operation request is sent to the disk and added to the pending list.

10. The method of claim 8, further comprising adding the new I/O to the pending list in response to a determination that the current sweep direction is up and an offset of the I/O request is greater than a lower bound parameter or the current sweep direction is down and the offset of the I/O request is less than an upper bound parameter.

11. The method of claim 8, further comprising:
   completing a pending I/O request on the disk;
   removing the I/O request from the pending list;
   determining whether the pending list is empty or has at least one I/O request pending for the disk; and
   reversing the current sweep direction.

12. The method of claim 11, further comprising:
removing every I/O request from the hold list; and
adding the every I/O request to the pending list.

13. The method of claim 8, further comprising:
determining a sweep direction in response to a determination that the upper bound parameter is the same as the lower bound parameter.

* * * * *